(12) United States Patent
Billeter et al.

(10) Patent No.: US 9,478,065 B2
(45) Date of Patent: Oct. 25, 2016

(54) SYSTEM AND METHOD FOR REMOTE GENERATION OF INDIRECT ILLUMINATION SOURCES IN THREE-DIMENSIONAL GRAPHICS

(71) Applicant: Robert Bosch GmbH, Stuttgart (DE)

(72) Inventors: Markus Billeter, Palo Alto, CA (US); Lei Yang, Cupertino, CA (US); Liu Ren, Cupertino, CA (US)

(73) Assignee: Robert Bosch GmbH, Stuttgart (DE)

( * ) Notice: Subject to any disclaimer, the term of this patent is extended or adjusted under 35 U.S.C. 154(b) by 500 days.

(21) Appl. No.: 13/828,871

(22) Filed: Mar. 14, 2013

(65) Prior Publication Data

US 2014/0267271 A1 Sep. 18, 2014

(51) Int. Cl.
*G06T 15/50* (2011.01)
*G06T 15/00* (2011.01)

(52) U.S. Cl.
CPC .......... *G06T 15/506* (2013.01); *G06T 15/005* (2013.01); *G06T 2210/52* (2013.01)

(58) Field of Classification Search
None
See application file for complete search history.

(56) References Cited

U.S. PATENT DOCUMENTS

| | | |
|---|---|---|
| 2005/0065425 A1 | 3/2005 | Matsumoto |
| 2012/0007865 A1 | 1/2012 | Ha et al. |
| 2012/0299921 A1 | 11/2012 | Budge et al. |
| 2012/0299922 A1* | 11/2012 | Ha et al. ..................... 345/426 |
| 2013/0016102 A1 | 1/2013 | Look et al. |

FOREIGN PATENT DOCUMENTS

EP 1039314 A2 9/2000

OTHER PUBLICATIONS

Herzog et al., "Render2MPEG: A Perception-based Framework Towards Integrating Rendering and Video Compression", Eurographics; 2008; vol. 27, No. 2; Germany (10 pages).
Honma et al., "Millimeter-Wave Radar Technology for Automotive Application", Technical Reports Mitsubishi Electric Advance; Jun. 2001; pp. 11-13 (3 pages).
Jarosz et al, "A Comprehensive Theory of Volumetric Radiance Estimation using Photon Points and Beams", ACM Transmissions on Graphics; Jan. 2011; pp. 1-19; vol. 30, No. 1 (19 pages).
Kageyama, "Toyota's 'Millimeter-Wave' Steering System Aims to End Car Crashes", Huff Post; Jan. 18, 2013; Japan (1 page).
Keller, "Instant Radiosity", Proceedings of the 24th annual conference on Computer graphics and interactive techniques (SIGGRAPH '97); 1997; ACM Press/Addison-Wesley Publishing Co.; New York, NY (20 pages).
Laine et al., "Incremental Instant Radiosity for Real-Time Indirect Illumination", Endographics Symposium on Rendering; 2007 (10 pages).

(Continued)

*Primary Examiner* — Edward Martello
(74) *Attorney, Agent, or Firm* — Maginot Moore & Beck LLP

(57) ABSTRACT

A method for generating three-dimensional graphics includes generating a virtual environment in a server including a first object, second object and a direct illumination source. The method includes generating a virtual point light (VPL) in the virtual environment at an intersection between a ray from the direct illumination source and the first object, and sending data corresponding to the VPL to a client computing device through a data network. The method includes generating an illumination of the second object in the virtual environment with the VPL received from the server, and displaying the illuminated second object.

18 Claims, 4 Drawing Sheets

(56) References Cited

OTHER PUBLICATIONS

Olsson et al., "Tiled Shading", Journal of Graphics, GPU and Game Tools; 2011; pp. 235-251; vol. 15, No. 4 (10 pages).

Palermo, "OpenGL Lighting", 15-462 Computer Graphics, Spring 2009 (21 pages).

Segovia, "Interactive Light Transport with Virtual Point Lights" 2007 (128 pages).

Walter et al., "Lightcuts: A Scalable Approach to Illumination", ACM Transactions on Graphics; Jul. 2005; pp. 1098-1107, Cornell University, USA (10 pages).

International Search Report and Written Opinion corresponding to PCT Application No. PCT/US2014/023036, mailed Jun. 24, 2014 (10 pages).

Ingo Radax, "Instant Radiosity for Real-Time Global Illumination", Technical Report, Vienna University of Technology, May 2008 (14 pages).

\* cited by examiner

SYSTEM AND METHOD FOR REMOTE GENERATION OF INDIRECT ILLUMINATION SOURCES IN THREE-DIMENSIONAL GRAPHICS

FIELD

This disclosure relates generally to the field of computer graphics and, more specifically, to systems and methods that display three-dimensional graphics.

BACKGROUND

Many modern software applications display three-dimensional representations of graphical objects and scenes as part of a user interface. Three-dimensional (3D) graphics are used in a wide range of applications including video games, simulations, virtual reality applications, geospatial information applications, and applications for mapping and navigation. In many applications, 3D graphics are more useful than two-dimensional (2D) graphics at depicting real-world environments and locations because the normal interaction between humans and the real-world occurs in three dimensions.

In one form of 3D graphics, different objects in a scene are formed from a large number of polygons. The polygons form shapes and structures in a 3D scene. Since most computing devices only display graphics with a two-dimensional display, the 3D graphics are converted into a rasterized array of two-dimensional pixels for display. The 2D display depicts portions of the three-dimensional scene in a similar manner to how a camera takes a two-dimensional photograph of 3D scenes in the real world. Many 3D graphics systems and application programming interfaces (APIs) including the Open Graphics Library (OpenGL) and the Direct 3D APIs provide common structures and interfaces to specialized graphics hardware for generation of 3D images in an efficient manner. The 3D software interacts with general purpose and specialized digital computing hardware that generates the 3D graphics in an efficient manner. In particular, graphical processing units (GPUs) are hardware components that are configured to generate polygons and other graphical effects that form a 3D scene. Modern computing devices typically execute software with a combination of instructions for a central processing unit (CPU) and the GPU to generate the 3D scene and enable interaction with the 3D scene in some software applications. In some hardware embodiments, the functionality of the CPU and GPU are merged together, physically and optionally logically, into a single a system on a chip (SoC) device.

Realistic rendering of 3D scenes is an important part of making 3D graphics useful in modern computing systems. Making 3D scenes more realistic can have aesthetic benefits, but can also improve the accuracy of information that is depicted in display of a 3D environment. For example, if a 3D environment realistically depicts the illumination of objects with lights and shadows, users of the 3D application can distinguish features more quickly and more accurately than if the lighting that illuminates the scene is generated in an unrealistic manner.

Modern 3D hardware and software implementations illuminate objects in the virtual environment using both direct and indirect lighting techniques. Direct lighting refers to the direct appearance of an object when light from an illumination source strikes the object. For example, the sun or light bulbs are direct illumination sources. An object that is illuminated by the direct illumination source reflects a portion of the light, and various properties of the object including color and textures applied to the object affect the appearance of the object in the 3D environment. The intensity and color temperature of the direct illumination source also affect the appearance of the object. Indirect illumination refers to light beams that emanate from a source other than a direct illumination source and strike an object. For example, light beams from a direct illumination source strike objects in a scene, and then the objects in the scene re-emit some of the light from the direct illumination source. The re-emitted light then strikes other objects, which in turn re-emit even more light in a repeating manner. In practical scenarios, some of the light is absorbed when each light beam strikes an object and a finite number of secondary reflections are visible to the human eye. Environments with highly reflective objects typically display greater changes when illuminated by indirect lighting compared to lower-reflectivity objects.

Modern 3D graphics hardware and software systems include various techniques for rendering indirect light. Many indirect lighting techniques include tradeoffs between accuracy and performance. For example, ray-tracing techniques model the paths of light beams from a direct illumination source through multiple indirect reflections from illuminated objects in a virtual environment. While ray-tracing is considered to be highly realistic, the modeling process for ray-tracing consumes a large amount of processing power and is usually reserved for pre-rendered 3D animations. Another technique for generating indirect illumination is referred to as the "virtual point light" (VPL) technique. In a VPL system, a direct illumination source casts light onto one or more objects in a virtual environment. At selected intersections between the light from the direct source and the objects, the 3D graphics system generates a "virtual" point light that simulates the indirect light that is reflected from the object. The VPL then emanates light from the object to simulate the effects of indirect lighting in the virtual environment. The 3D graphics system generates a selected number of VPLs to simulate indirect light with the number and arrangement of VPLs being selected to provide a suitable balance between accuracy and processing computational performance in the 3D graphics system.

Commercially available 3D graphics hardware including GPUs that are used in desktop and server computers are capable of rendering complex virtual environments including indirect lighting using VPL techniques and other indirect lighting techniques that are known to the art. While powerful 3D graphics hardware is commercially available, an increasing number of mobile electronic devices including smartphones, tablets, and handheld GPS navigation devices are being used as hardware platforms that implement 3D graphics. The hardware implementations in mobile electronic devices are often less sophisticated than in larger stationary computing devices due to limitations in size, weight, power consumption, and heat output that are inherent to smaller mobile electronic devices. While mobile electronic devices include CPU and GPU hardware processors that can generate 3D graphics, the processors are often either unable to produce sophisticated 3D graphics displays, or consume unacceptably large amounts of power while generating the 3D graphics. In particular, many forms of indirect lighting including VPLs are either too computationally intensive for use with some mobile electronic devices, or result in an unacceptable loss in battery life due to the increased power consumption of the processor to render the virtual environment. Consequently, improvements to 3D graphics systems that enable generation of graphics that include indirect lighting effects on hardware devices with limited 3D graphics processing capabilities would be beneficial.

SUMMARY

In one embodiment, a method for classifying a three-dimensional graphical object in a virtual environment has been developed. The method includes generating a virtual environment with a first processor in a server computing device, the virtual environment including a first object, a second object, and a direct illumination source, a memory in the server computing device storing data corresponding to the virtual environment including the first object, the second object, and the direct illumination source, generating with the first processor in the server computing device a virtual point light (VPL) at a location in the virtual environment corresponding to an intersection of a ray from the direct illumination source and the first object, sending data corresponding to the VPL to a client computing device through a data network, generating with a second processor in the client computing device illumination data for a surface of the second object in the virtual environment with reference to illumination data identified with reference to the direct illumination source and the VPL received from the server computing device, and storing data corresponding to the virtual environment including the direct illumination source, the first object and the second object in a memory in the client computing device, and generating with the second processor in the client computing device a graphical display of the virtual environment including the surface of the second object with the generated illumination data.

In another one embodiment, a system that classifies a three-dimensional graphical object in a virtual environment has been developed. The system includes a server computing device and a client computing device. The server computing device includes a first memory configured to store data corresponding to a virtual environment including a first object, a second object, and a direct illumination source, a first network interface device configured to send data through a data network, and a first processor operatively connected to the first memory and the first network interface device. The first processor is configured to generate the virtual environment including the first object, the second object, and the direct illumination source, generate a virtual point light (VPL) in the virtual environment at a location corresponding to an intersection of a ray from the direct illumination source and the first object, and send data corresponding to the VPL with the first network interface device to the client computing device through the data network. The client computing device includes a second memory configured to store data corresponding to the virtual environment including the first object, the second object, and the direct illumination source, a second network interface device configured to receive data from the data network, a display device, and a second processor operatively connected to the second memory, the second network interface device, and the display device. The second processor is configured receive data corresponding to the VPL from the server computing device with the second network interface device, generate illumination data for a surface of the second object in the virtual environment with reference to illumination identified with reference to the direct illumination source and the VPL received from the server computing device, store data corresponding to the virtual environment including the direct illumination source, the first object and the second object in the second memory, and generate with the display device a graphical display of the virtual environment including the surface of the second object using the generated illumination data.

DETAILED DESCRIPTION

Figure 1:
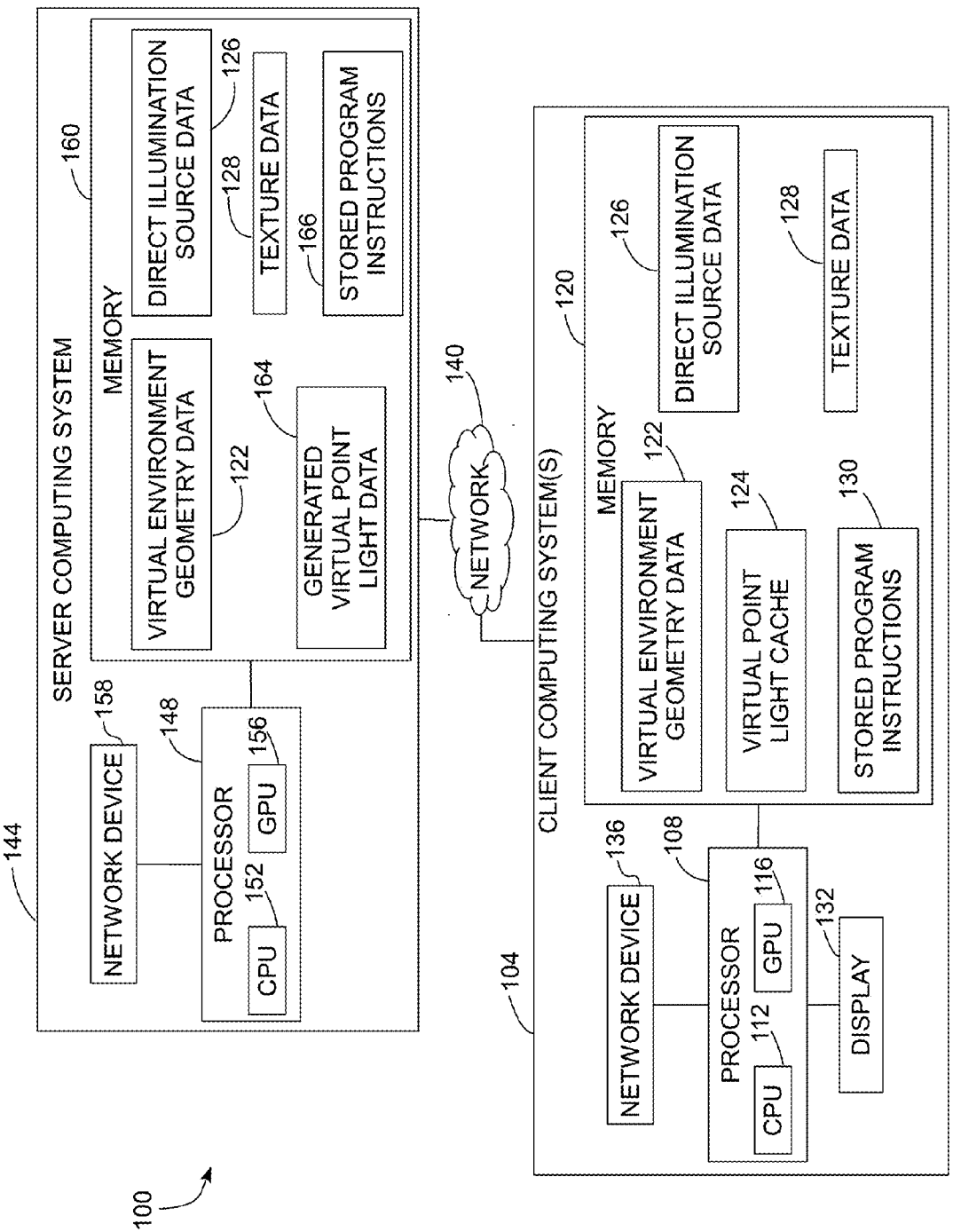
FIG. 1 is a schematic diagram of a distributed computing system that enables one or more client devices to display 3D graphics with indirect lighting effects.

For the purposes of promoting an understanding of the principles of the embodiments disclosed herein, reference is now be made to the drawings and descriptions in the following written specification. No limitation to the scope of the subject matter is intended by the references. The present disclosure also includes any alterations and modifications to the illustrated embodiments and includes further applications of the principles of the disclosed embodiments as would normally occur to one skilled in the art to which this disclosure pertains.

As used herein, the term "texture" refers to any graphical image or images that are mapped to one or more polygons in a three-dimensional display to alter the appearance of the polygons in a graphical display. For example, common textures for materials depicted in virtual environments include cloth, stone, wood, metal, concrete, carpeting, and a wide range of materials that simulate materials found in the physical world. In some embodiments, textures are formed from two-dimensional graphics images that are applied to the surfaces of polygons in 3D objects in the virtual environment using texture mapping techniques that are known to the art. Some 3D graphics systems apply multiple layers of textures to a single object to provide a more complex appearance for the objects. Different types of texture can include varying levels of reflectivity or absorption to lights that illuminate the 3D object that is generated with the selected texture.

As used herein, the terms "graphical object" or "object" refer to data that correspond to a group of polygons that form a model of a single object in a larger virtual environment. A virtual environment includes one or more graphical objects that are located at different coordinates and in various orientations in the virtual environment. In some embodiment of a virtual environment, the graphical objects change coordinates, orientation, or change shape in order to depict movement of one or more objects in the virtual environment.

As used herein, the term "point light" refers to an illumination source in a 3D virtual environment that emits light from a single point location, with the light being emitted in a uniform manner in every direction within a predetermined light cone extending from the point location in the 3D virtual environment. In one configuration, the light cone for a point light is a hemispherical region around the point light to enable the point light that is located proximate to a surface to emit light into an virtual environment that is within the hemispherical region of the light cone while preventing the illumination source from providing undesired illumination to the surface of the object that is proximate to the point light. Some virtual environments include point lights, in addition to other types of light, as sources of illumination in the virtual environment. As used herein, the term "virtual point light" (VPL) refers to a point light that a graphics processing device generates dynamically to simulate the effects of indirect lighting within a 3D virtual environment. The generated VPL acts as a point light and emits light onto one or more graphical objects in the virtual environment to simulate the effects of indirect lighting.

FIG. 1 depicts a distributed graphics system 100 that enables generation of graphics for a 3D virtual environment using a client computing device 104 with VPLs that are generated by a separate server computing device 144 and transmitted to the client computing device 104 through a data network 140. In the system 100, the client computing system 104 includes a processor 108, a memory 120, a network interface device 136, and a display 132. FIG. 1 depicts a single client computing system 104 for illustrative purposes, but multiple client computing systems with the configuration of the client computing system 104 are configured to communicate with the server 144 and to generate different graphical depictions of a 3D virtual environment using the VPLs that the server computing system 144 generates during operation. The server computing system 144 includes another processor 148, memory 160, and network adapter device 158. In the embodiment of FIG. 1, the network 140 includes one or more wide area networks (WANs) and local area networks (LANs) that communicatively couple the client computing system 104 and server computing system 144. In one embodiment, the client computing system 104 is a mobile electronic device such as a smartphone, tablet computer, notebook computer, or an in-vehicle information system that is installed in a vehicle. The client computing device accesses the data network 140 using a wireless network device 136 using a wireless LAN (WLAN) network adapter using, for example, an IEEE 802.11 wireless protocol or a wireless WAN (WWAN) network adapter using, for example, a 3G or 4G wireless communication protocol.

In the client computing system 104, the processor 108 includes one or more integrated circuits that implement the functionality of a central processing unit (CPU) 112 and graphics processing unit (GPU) 116. In some embodiments, the processor is a system on a chip (SoC) that integrates the functionality of the CPU 112 and GPU 116, and optionally other components including the memory 120, and network device 136, into a single integrated device. In one embodiment, the CPU is a commercially available central processing device that implements an instruction set such as one of the x86, ARM, Power, or MIPS instruction set families. The GPU includes hardware and software for display of both 2D and 3D graphics. In one embodiment, processor 108 includes software drivers and hardware functionality in the GPU 116 to generate 3D graphics using the OpenGL, OpenGL ES, or Direct3D graphics application programming interfaces (APIs). For example, the GPU 116 includes one or more hardware units including geometry processing units, pixel shader units, vertex shader units, fragment shader units, and image rasterization units for the generation of a rasterized 2D depiction of a 3D virtual environment. During operation, the CPU 112 and GPU 116 execute stored programmed instructions 130 that are retrieved from the memory 120. In one embodiment, the stored programmed instructions 130 include operating system software and one or more software application programs, including software applications that generate 3D graphics such as games, simulations, and mapping programs. The processor 108 executes the 3D software program and generates 3D graphical output corresponding to a 3D virtual environment through the display device 132.

In the client computing system 104, the memory 120 includes both non-volatile memory and volatile memory. The non-volatile memory includes solid-state memories such as NAND flash memory, magnetic and optical storage media, or any other suitable data storage device that retains data upon deactivation of power-loss for the client computing system 104. The volatile memory includes static and dynamic random access memory (RAM) that stores software and data, including graphics data and map feature data, during operation of the client computing system 104.

In the client computing system 104, the memory 120 stores virtual environment geometry data 122, a virtual point light (VPL) cache 124, direct illumination source data 126, and texture data 128 in addition to the stored program instructions 130. The geometry data 122 include polygon data corresponding to vertices for one or more polygons that form graphical objects in the 3D virtual environment. The geometry data 122 also include coordinates for the locations and orientations of objects in the virtual environment to enable generation of graphics corresponding to 3D environments and objects that are located in the virtual environment. The VPL cache 124 stores the coordinates and illumination properties, including color, intensity, and light cone orientation, for one or more VPLs that are received from the server computing system 144. The direct illumination source data 126 include the coordinates and attributes for one or more direct illumination sources that project light onto the surfaces of one or more objects in the 3D virtual environment. Examples of direct illumination sources include point lights and graphical objects that emit light, which are referred to as emissive illumination sources, to illuminate the virtual environment. For example, a 3D object that is shaped in the form of a light bulb and that emits light into a virtual environment from the surface of the light bulb is an example of an emissive light. The texture memory 128 stores data corresponding to one or more textures that are mapped to objects in the 3D virtual environment.

The client computing system 104 includes a display device 132. In one embodiment, the display device 132 is a liquid crystal display (LCD), organic light-emitting diode display (OLED) or other suitable display device that generates image output for viewing by a user of the client computing system 104. Some client computing system embodiments include a display 132 that is incorporated into a housing of a device, such as an LCD display that is incorporated into a housing of a smartphone or other mobile electronic devices. In other embodiments, the client computing device includes a wired or wireless output device that supplies a video signal to an external display or projection device. In an embodiment of the client computing system 104 that is integrated with a vehicle, the display 132 is commonly mounted in a dashboard or other fixed location in the vehicle. In an alternative embodiment, the display device 132 is a head-up display (HUD) that is projected onto a windshield of a vehicle or projected onto goggles or glasses that are worn by an occupant in the vehicle.

The server computing device 144 includes another processor 148 having a CPU 152 and GPU 156. While not a requirement, in some embodiments the CPU 152 and GPU 156 in the server computing system 144 include greater computational power than the respective CPU 112 and GPU 116 in the client processor 108. For example, in one embodiment the server computing system 144 is a larger physical server that typically remains stationary during operation and draws power from a power grid instead of being powered by a comparatively small battery in a mobile electronic device. The electrical power available to the server computing system 144 enables the use of CPUs and GPUs with greater computing power than is practical in the client computing systems 104. In another embodiment, the server computing system 144 is formed from a cluster of multiple computing devices that provide VPLs and other services to a large number of the client devices 104 in a distributed computing system. In the server computing system 144 of FIG. 1, the network device 158 is typically a wired network adapter such as an Ethernet network adapter, although the server computing system 144 can be configured to use wireless network devices in addition to or instead of the wired network device.

In the server computing system 144, the memory 160 includes both non-volatile memory and volatile memory. The non-volatile memory includes solid-state memories such as NAND flash memory, magnetic and optical storage media, or any other suitable data storage device that retains data upon deactivation or power-loss for the server computing system 144. The volatile memory includes static and dynamic random access memory (RAM) that stores software and data, including graphics data and map feature data, during operation of the server computing system 144.

In the server computing system 144, the memory 160 stores the same virtual environment geometry data 122, direct illumination source data 126, and texture data 128 as the memory 120 in the client computing devices 104. The server computing system 144 maintains data synchronization with the client computing devices 104 so that the server computing system 144 generates VPLs using the same virtual environment geometry data 122 that the client computing systems 104 use to display the virtual environment, including the use of the same direct illumination sources and textures that the client computing devices use for generation of graphical displays of the virtual environment.

In the memory 160, the stored program instructions 166 for the server computing system include a different set of programs than are used on the client computing systems 144. As described below in more detail in FIG. 1, the processor 148 executes the stored program instructions 166 to generate VPLs for the virtual environment that is represented by the virtual environment geometry data 122. The generated VPLs are stored in the generated VPL data 164 in the memory 160. In embodiments where the geometry data in the virtual environment 122 or the direct illumination source data 126 change over time, the processor 148 invalidates VPLs that no longer conform to the virtual environment and generates new VPLs for the updated virtual environment data. For example, the processor 148 invalidates the VPL if an object with a surface that is proximate to the VPL is transformed so that the direct illumination source no longer illuminates the surface, or if the direct illumination source moves, changes color, or changes output intensity, or if another object is transposed between the direct illumination source and the object that is associated with the VPL. The server computing system 144 sends an update of the generated VPL data 164 to the client computing systems 104 through the network 140 using the network device 158.

In the system 100, the server computing system 144 performs the computations for generation of the VPL data 164, while the client computing devices 104 treat the VPLs as additional direct illumination sources during the generation of graphics corresponding to the 3D virtual environment. The client computing systems 104 are not required to generate the VPLs, which reduces the computational complexity of the client stored program instructions 130 and enables client computing systems with limited CPU and GPU processing hardware to produce graphics with indirect lighting effects that would not otherwise be practical to produce using the client computing system hardware.

Figure 2:
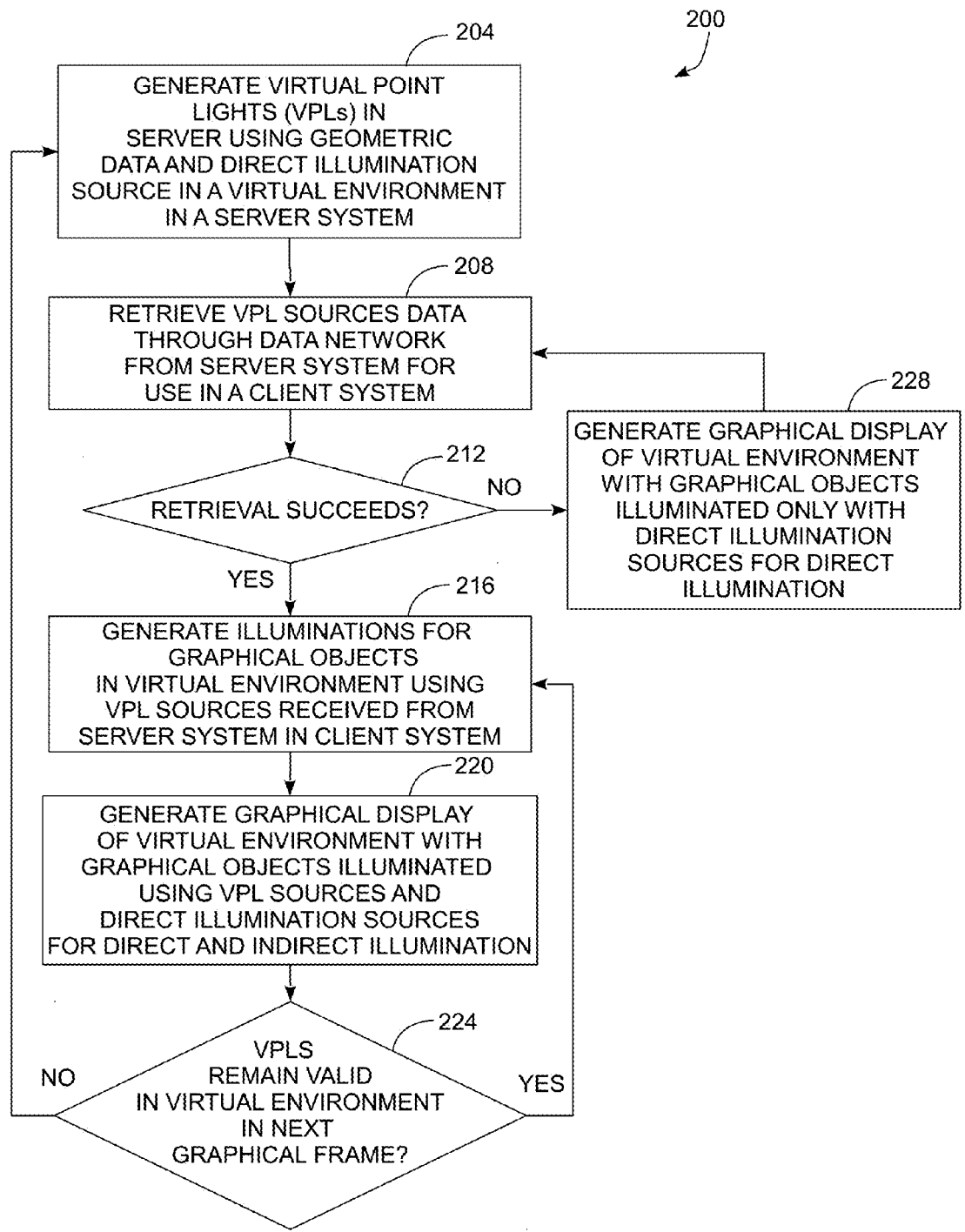
FIG. 2 is a block diagram of a process for generating virtual point lights (VPLs) in a server computing system and using the generated VPLs to produce graphics with indirect lighting effects in client computing systems.

FIG. 2 depicts a process 200 for generation of virtual point lights (VPLs) in a server computing system for distribution to one or more client computing systems. In the description below, a reference to the process 200 performing or doing some function or action refers to one or more controllers or processors that are configured with programmed instructions, which are executed by the controllers or processors to implement the process performing the function or action or operating one or more components to perform the function or action. The process 200 is described with reference to the distributed 3D graphics system 100 of FIG. 1 for illustrative purposes.

Process 200 begins with generation of one or more virtual point lights (VPLs) in a virtual environment in a server computing system (block 204). In the system 100, the server computing system 144 generates the VPLs in the virtual environment. The processor 148 retrieves the virtual environment geometry data 122, including multiple graphical objects, from the memory 160 to form the virtual environment. The processor 148 also retrieves the data corresponding to one or more direct illumination sources 126 from the memory 160, and optionally retrieves texture data 128 in virtual environments where the surfaces of geometric objects receive textures. The processor 148 executes the stored program instructions 166 to generate the virtual environment and to generate one or more VPLs in the virtual environment. As described below in FIG. 3, the processor 148 identifies intersections between light rays from one or more of the direct illumination sources 126 and graphical objects in the virtual environment data 122 to generate VPLs in the virtual environment. The processor 148 stores data corresponding to the VPLs, including the coordinates, intensity, and light color of each VPL, as the generated VPL data 164 in the memory 160.

Figure 3:
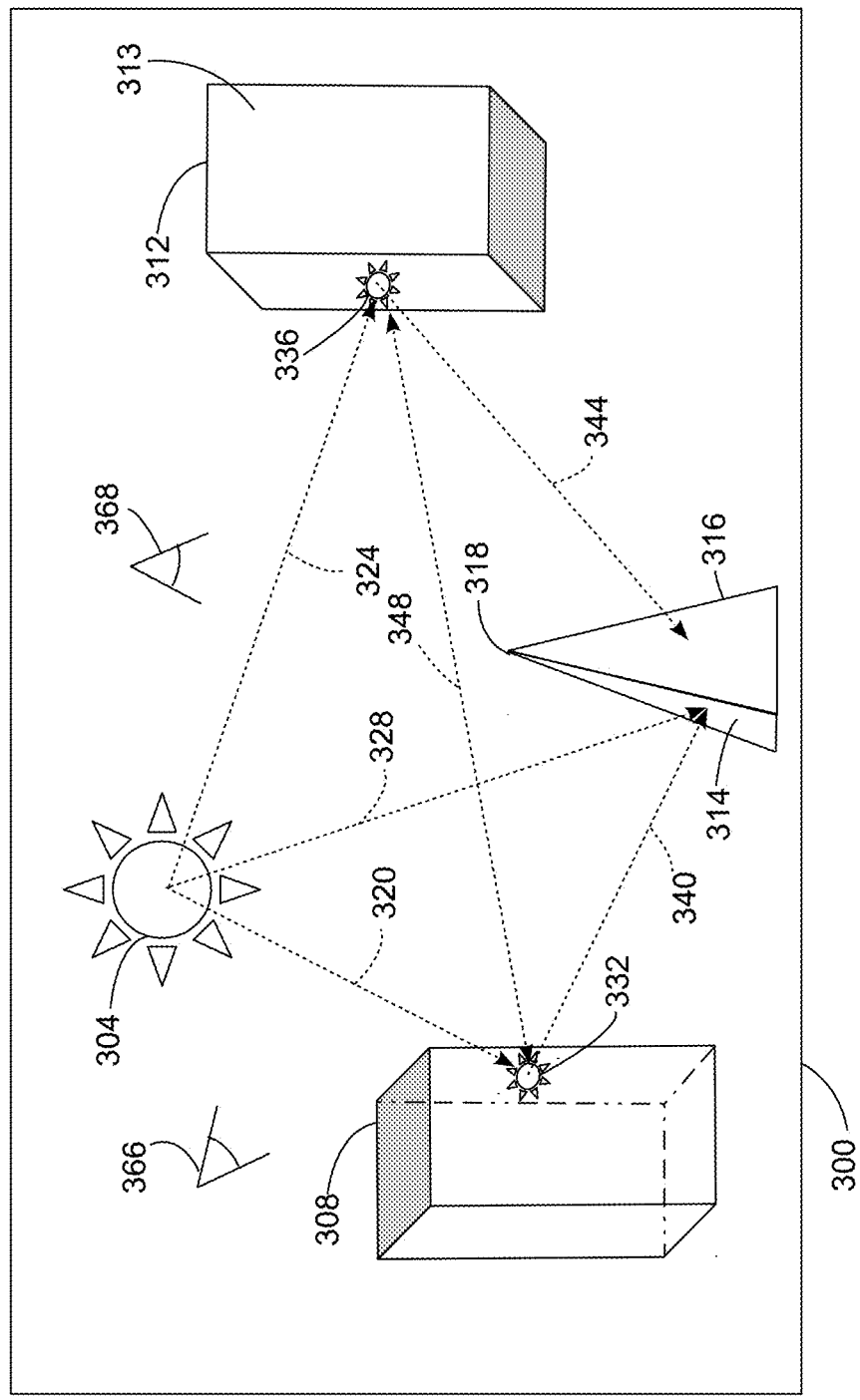
FIG. 3 is a depiction of a virtual environment including a direct illumination source, graphical objects, and VPLs.

FIG. 3 depicts objects and illumination sources in an illustrative virtual environment 300 that is described in conjunction with the process 200 and the 3D graphics system 100. The virtual environment 300 includes a direct illumination source 304, and graphical objects 308, 312, and 318. In the virtual environment 300, the direct illumination source 304 projects light onto some of the surfaces of the objects 308, 312, and 318 directly. Examples of direct illumination sources include virtual representations of the sun, moon, or artificial illumination sources that illuminate a virtual environment in an approximation of the behavior of illumination sources in the physical world. For example, the rays 320, 324, and 328 depict direct illumination rays that reach the graphical objects 308, 312, and 318, respectively. In the depiction of the virtual environment 300, the graphical object 318 includes one face 314 that is aligned to receive illumination from the direct illumination source 304, and another face 316 that is oriented away from the direct illumination source 304. In addition to the direct illumination source, the virtual environment 300 is optionally generated with an ambient light level. The ambient light level provides a uniform minimum level of illumination to each surface of each object in the virtual environment, including to surfaces of objects that do not receive illumination from either a direct illumination source or an indirect illumination source such as a VPL. For example, in the virtual environment 300 the face 313 of the graphical object 312 only receives ambient illumination. In virtual environments that do not include ambient illumination, any surface of an object that does not receive illumination from a direct or indirect illumination source is typically displayed as black in a graphical output of the virtual environment.

FIG. 3 includes two virtual point lights (VPLs) 332 and 336. The VPL 332 is generated at a location on the surface of the graphical object 308 at the intersection of the light ray 320 and the surface of the graphical object 308. Similarly, the VPL 336 is generated at the location of the intersection of the light ray 324 with the surface of the graphical object 312. Each VPL behaves as a point illumination source, with light projected from the location of the VPL in a uniform manner in the 3D space of the virtual environment 300. In the example of FIG. 3, the VPLs 332 and 336 each emit light into a hemispherical light cone that extends outward from the corresponding surfaces of the objects 308 and 312, respectively. For example, the intensity of the light emitted from the VPL 332 is identified with reference to the intensity of the direct illumination source 304, the distance between the direct illumination source 304 and the incident surface of the graphical object 308, and the reflectivity of the surface of the graphical object 308. The color of the VPL 332 is identified with reference to the color of light emitted from the direct illumination source 304, and on either a surface color or surface texture of the graphical object 308.

In the system 100, the processor 148 in the server computing system 144 generates the VPLs 332 and 336 using a VPL generation technique that is known to the art. In the VPL generation process, the server computing system 144 generates a selected number of VPL lights to provide indirect illumination to different graphical objects in the virtual environment 300. The processor 148 generates the VPLs using, for example, ray casting to generate a sufficient number of VPLs to provide indirect illumination to the graphical objects in the virtual environment 300 while limiting the generated VPLs to a number that is suitable for use with the GPU 116 in the processor 108 of the client computing system 104. For example, while the direct illumination source 304 theoretically emits a large number of light rays into the virtual environment 300, the processor 148 uses an optimization process to select a limited number of light rays from the illumination source 304 and corresponding intersections between the light rays and other objects in the virtual environment 300 for generation of the VPLs.

In the embodiment of FIG. 3, the server computing system 144 identifies the VPLs 332 and 336 from the intersection of selected light rays from the direct illumination source 304 and the objects 308 and 312. FIG. 3 depicts the two VPLs 332 and 336 for illustrative purposes, but the server computing system 144 is configured to generate a one or more VPLs for any graphical object in the virtual environment that receives illumination from the direct illumination source 304 or other direct illumination sources. Additionally, in some embodiments the processor 148 is configured to generate additional VPLs from the light rays that emanate from a previously generated VPL. For example, in the virtual environment 300, the processor 148 optionally generates another VPL (not shown) at the location on the object 318 where the ray 340 from the VPL 332 intersects with the object face 314.

While FIG. 3 includes a graphical depiction of the virtual environment 300 for illustrative purposes, the server computing system 144 is not required to generate a fully rendered graphical display of the virtual environment during process 200. For example, the server computing system 144 generates the VPLs 332 and 336 in the virtual environment 300, but the server computing system 144 is not required to use the VPLs 332 and 336 to illuminate graphical objects in the virtual environment 300 for display using a display device. During process 200, the processor 148 omits additional operations that are commonly associated with generating 3D graphics, such as rasterization of output images corresponding to a particular location and viewing perspective in the virtual environment. During operation, the server only generates a single set of global VPLs, regardless of the number of clients, which enable the server to operate in a more efficient manner. For each client, the server selects a relevant subset of the VPLs from the set of globally computed VPLs. The client receives the relevant subset of VPLs. The server only generates VPLs for a scene once, and this common set of VPLs is shared between different clients. As described below, the client devices generate graphical outputs corresponding to the virtual environments using the VPLs that the server system 144 generates to produce indirect illumination in the virtual environment.

Referring again to FIG. 2, in the distributed graphics system 100, the client system or systems 104 retrieve data corresponding to the generated VPLs from the server system 144 (block 208). As described above, the VPL data include coordinates, light intensity levels, and light colors for each VPL in the virtual environment. In the system 100, the server computing system 144 compresses VPL data prior to transmission through the network 140 to the client systems 104 to minimize the time and network bandwidth required to transmit the VPL data. In one embodiment, the client system 104 establishes a network communication session with the server system 144 through the network 140 using a standard network communication protocol such as TCP/IP or UDP/IP. If the retrieval of the VPL data succeeds (block 212), then the client system 104 receives the generated VPL data from the server 144 using the network device 136, and stores the VPL data in the VPL cache 124 in the memory 120. In another embodiment of the process 200, the server system 144 establishes a network session with one or more of the client computing systems 104 to transmit updated VPL data to the client computing systems in a "push" configuration. In either embodiment, the client computing systems 104 receive the VPL data if the network connection between the client systems 104 and the server system 144 enable successful transmission of the VPL data.

If the client system 104 successfully receives the VPL data from the server system 144 (block 212), then the processor 108 in the client system 104 generates illuminations for the graphical objects in the virtual environment using both the direct illumination source and the VPLs that are received from the server computing system to provide illumination to the virtual environment (block 216). For example, in the virtual environment of FIG. 3, the processor 108 illuminates the objects 308, 312, and 318 using both the direct illumination source 304, and the VPLs 332 and 336. In the processor 108, the GPU 116 receives the geometry data for the objects in the virtual environment, the texture data for textures that are applied to the objects, and the coordinates, colors, and intensities for the direct illumination source 304 and the VPLs 332 and 336.

The GPU 116 computes the illumination of the objects in the scene, and in some instances illuminates portions of the objects with multiple illumination sources. For example, the face 314 in the object 318 receives illumination from the direct illumination source 304 and the VPL 332. The objects 308 and 312 each receive partial illumination from the direct illumination source 304 and from the VPLs 332 and 336, as indicted by the ray 348. In one embodiment, the GPU 116 identifies the illumination received for each pixel that is displayed on the surface of the object. The total illumination for the object is identified with reference to a sum of the emitted light from one or more illumination sources in the virtual environment and to the properties of how the object reflects the light including the ambient, diffuse, and specular reflectivity for the object. Ambient reflection refers to a uniform level of light that is applied to all objects in a virtual environment. The ambient light is useful for the display of some objects that are not illuminated by another form of light in the virtual environment since the object is typically displayed as black if no light is applied to the object. The diffuse light intensity represents light that is reflected from objects with rough surfaces that scatter the light. The specular light intensity refers to highly reflective materials such as polished metal or glass that have a shiny appearance.

Process 200 continues as the client computing system generates a graphical depiction of the virtual environment, including graphical objects that are illuminated using the direct illumination sources and VPLs (block 220). In the client computing system 104, the GPU 116 generates a rasterized image of the 3D virtual environment from a predetermined view point in the 3D virtual environment. The processor 108 directs the rasterized image data to the display 132 to provide a graphical output of the virtual environment and objects in the virtual environment. The GPU 116 in the client computing device optionally applies other graphical processing techniques to the image data including, but not limited to, anti-aliasing, depth of field blurring, anisotropic filtering, and the like, prior to generating the output through the display device 132.

In many 3D graphical applications, the client system 104 displays the virtual environment in an animated manner. For example, in one configuration a virtual camera moves through a virtual environment and the generated display of the virtual environment changes as the location and orientation of the virtual camera change in a similar manner to a moving camera in the physical world. In addition to a moving virtual camera, some virtual environments include graphical objects that move and change shape over time. Common examples of software applications that include animation of graphical objects in a virtual environment include games and simulations. In the client computing device 104, the processor 108 generates the animation as a series of frames, where each frame is a single graphical depiction of the virtual environment, in rapid succession. Each frame in the animation depicts a small change in the view of the virtual environment or in one or more graphical objects within the virtual environment. When the display 132 generates the graphical frames at a sufficiently high rate, such as a rate of 15 frames per second or higher, the progressive series of frames provide the appearance of movement in the virtual environment to the human eye.

During process 200, the processor 148 in the server computing system 144 and the processor 108 in the client computing system 104 identify if one or more VPLs remain valid for use in providing illumination for the virtual environment in multiple frames of an animation. For the purposes of process 200, a VPL remains valid for multiple animation frames if the path between the direct illumination source and the intersection with the graphical object at the location of the VPL remains unobstructed, if the intensity and color of the light from the direct illumination source remains constant, if the distance between the graphics object and the direct illumination source remains constant, and if the color or texture material of the graphical object remains unchanged between frames of the animation. As is known in the art, the intensity of an illumination source can include different parameters for diffuse and specular intensities of the light. In one mode of operation, the objects and direct illumination sources in the virtual environment remain in a static configuration relative to one another and a virtual camera moves through the virtual environment. The VPLs in the virtual environment remain valid as the virtual camera moves through the virtual environment. In one configuration, the system 100 includes multiple client computing systems 104 that display different views of a single virtual environment. The server computing system 144 generates a single plurality of VPLs that remain valid for each of the clients even if each client computing system displays the virtual environment using virtual cameras with different coordinates and orientations in the virtual environment. For example, in FIG. 3, two different virtual cameras 366 and 368 correspond to the graphical views of the virtual environment 300 that are generated in two different client computing systems. As the virtual cameras 366 and 368 move through the virtual environment 300, the VPLs 332 and 336 remain valid because the arrangement of the direct illumination source 304 and the graphical objects 308, 312, and 318 remain unchanged.

In another animation mode, one or more of the graphical objects or direct illumination sources in the virtual environment move or are otherwise altered within the 3D virtual environment. During process 200, the processors in both the server computing system 144 and the client computing system 104 perform the same transformations to graphical objects and direct illuminations sources in the virtual environment data to ensure consistency in the virtual environments between the server and the client systems. As used herein, a "transformation" to a graphical object or an illumination source in the virtual environment includes any modification to the data corresponding to the object or illumination source or a change of the coordinates and orientation of the object or illumination source in the virtual environment. Examples of transformations include operations that move, rotate, and change the shape or texture of the object. During the animation of objects in the virtual environment, some or all of the VPLs may become invalid due to the transformations of objects and illumination sources in the virtual environment.

Figure 4:
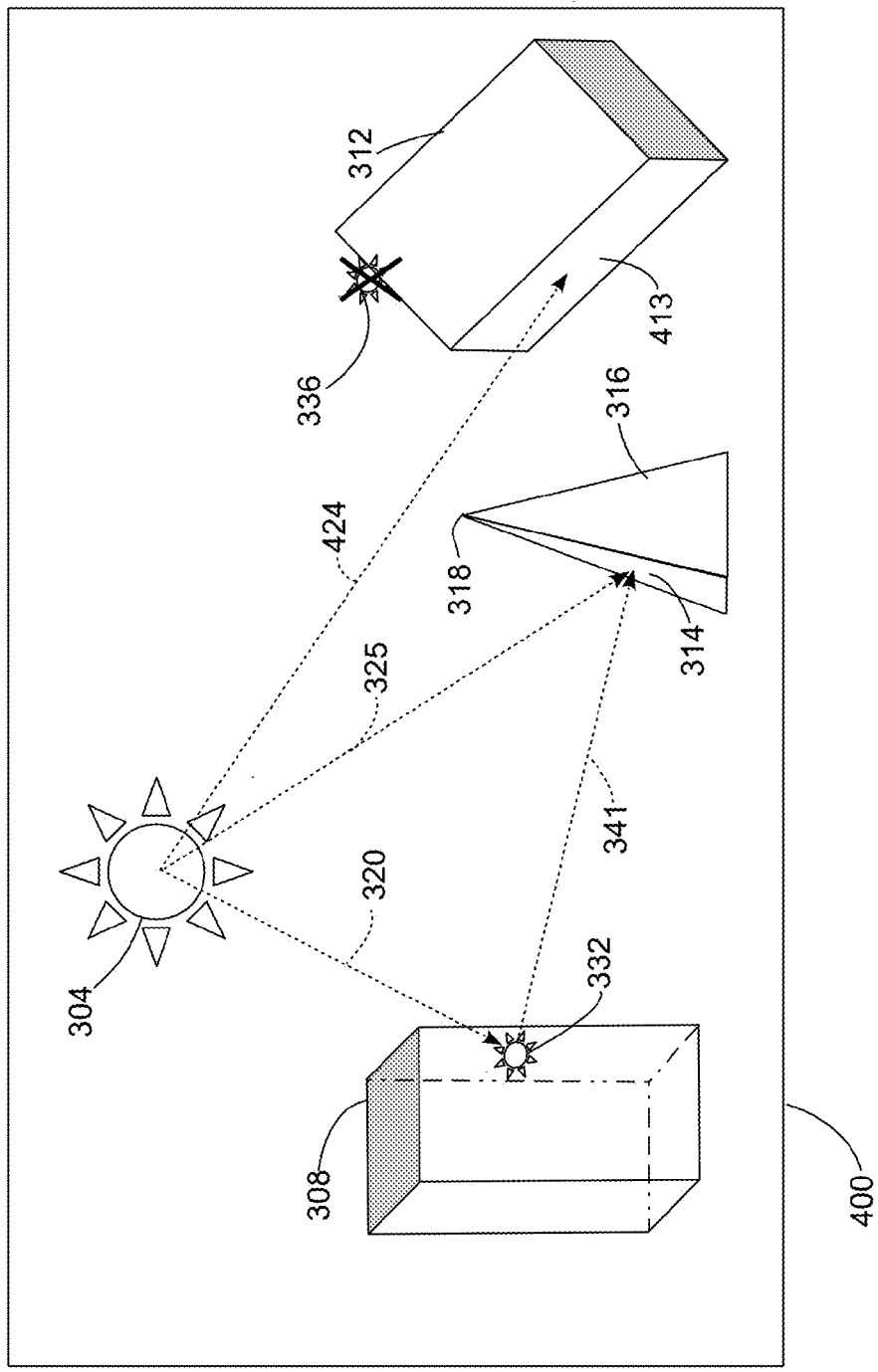
FIG. 4 is a depiction of the virtual environment of FIG. 3 after graphical objects in the virtual environment have moved from the locations depicted in FIG. 3.

For example, FIG. 4 depicts a virtual environment 400, which includes modifications to some of the graphical objects in the virtual environment 300 of FIG. 3. In FIG. 4, the graphical object 312 has rotated to present a different face of the graphical object 312 to the direct illumination source 304. Additionally, the graphical object 318 has moved to a different location in the virtual environment 400 from the arrangement depicted in FIG. 3. During process 200, the processor 148 of the server computing system 144, identifies that the VPL 336 is invalid due to the change in the orientation and location of the object 312. In the example of FIG. 4, the VPL 332 remains valid because the arrangement of the direct illumination source 304 and the graphical object 308 remains unchanged and light ray 320 reaches the surface of the object 308 without being obstructed. FIG. 4 depicts a transformation of the object 318 in the virtual environment 400, because the object 318 has moved from the location that is depicted in FIG. 3. The illumination that the object 318 receives from the direct illumination source 304 through the ray 325 and the VPL 332 through the ray 341 differs from the illumination in FIG. 3 due to the change in location of the object 318. As described above, the client computing system 104 is configured to generate a graphical output of the object 318 using the direct illumination source 304 and the VPL 332 to simulate indirect illumination in the virtual environment 400.

During process 200, the server computing system 144 generates updated VPLs for the virtual environment (block 204) at a constant rate and the client computing system 104 attempts to retrieve updated VPLs from the server computing system 144 (block 208). As described above, in the system 100, the server computing system 144 identifies when VPLs are invalidated and generates new VPLs to provide indirect illumination for the updated configuration of objects and direct illumination sources in the virtual environment. The server computing system 144 generates the updated VPLs, and the client computing system 104 retrieves the data corresponding to the updated VPLs through the data network 140.

As described above, the VPLs act as point illumination sources in the virtual environment 300. During process 200, the client computing system 104 receives the VPL data to generate an indirect lighting effects. During illumination of the virtual environment, however, the processor 108 in the client computing device 104 only applies direct lighting effects from the direct illumination sources 126 that are stored in the memory 120 and with the VPLs that are received from the server computing device 144 and stored in the VPL cache 124. Thus, the client computing system 104 does not require software or dedicated hardware units to identify locations and generate the VPLs in the virtual environment. Instead, the GPU 116 in the client computing system 104 treats the VPLs that are received from the server computing system 144 as additional direct illumination sources and illuminates the objects in the virtual environment using only direct illumination sources. The generation of the VPLs in the server computing system 144 enables the client computing system 104 to generate graphical depictions of the virtual environment including indirect lighting effects with a reduced computational load on the client computing system 104. In embodiments where the client computing system 104 includes simplified processor hardware, the VPLs from the server computing system 144 enable the client computing system 104 to generate depictions of the graphical objects in the virtual environments with indirect lighting effects where conventional techniques for generating the indirect lighting effects would be impractical.

In some operating conditions during the process 200, the client system 104 does not successfully receive the VPL data from the server system 144 (block 212). In the system 100, the client 104 may experience a temporary loss of connectivity to the network 140 or the VPL data from the server system 144 may be corrupted or fail to arrive in a timely manner for use in generating illumination in the virtual environment. In the system 100, the client 104 is configured to generate the graphical display of the virtual environment using only the direct illumination sources that are present in the virtual environment if the VPL data are unavailable (block 228). As depicted in FIG. 4, if the VPL 336 is invalidated due to changes in the virtual environment 400, then the server system 144 generates a request to send the updated VPL data to the client system 104, or the client system 104 retrieves the VPL data in addition to other data updates regarding changes in the virtual environment data. During process 200, if the client system 104 fails to receive the updated VPL data, then the processor 108 generates a graphical depiction of the graphical objects in the virtual environment using only the direct illumination sources and ambient lighting in instances where a VPL has been invalidated (block 228).

For example, the processor 108 retrieves the virtual environment geometry data 122, direct illumination source data 126, and texture data 128 from the client memory 120 to generate a display of the virtual environment 400. During the graphical display generation process, the client processor 108 illuminates the graphical objects 308, 312, and 318 using the direct illumination source 304, and optionally an ambient light level for the entire virtual environment. In the configuration of FIG. 4, the VPL 336 is invalidated, and the client computing device has failed to retrieve a valid VPL that conforms to the updated configuration of the object 312. Consequently, the object 318 only receives illumination from the direct illumination source 304, the remaining valid VPL 332, and the ambient illumination for the virtual environment 400. For example, in FIG. 4, the face 316 on the graphical object 318 only receives illumination from the ambient illumination in the virtual environment 400. Additionally, the face 413 on the object 312 only receives illumination from the direct illumination source 304, as indicated by the ray 424, while the object 318 blocks reflected light from the VPL 332 from reaching the object 312. The client device 104 displays the generated graphics for the virtual environment using the display device 132. If the VPLs in the virtual environment become invalid during process 200, the client system 104 continues to generate the graphical depiction of the virtual environment using only the direct and ambient illumination until the client device successfully receives valid VPL data from the server system (blocks 208 and 212).

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed is:
1. A method for rendering graphics corresponding to a three-dimensional virtual environment comprising:
  generating a virtual environment with a first processor in a server computing device, the virtual environment including a first object, a second object, and a direct illumination source, a memory in the server computing device storing data corresponding to the virtual environment including the first object, the second object, and the direct illumination source;
  generating with the first processor in the server computing device a virtual point light (VPL) at a location in the virtual environment corresponding to an intersection of a ray from the direct illumination source and the first object;
  sending data corresponding to the VPL to a client computing device through a data network;
  generating with a second processor in the client computing device illumination data for a surface of the second object in the virtual environment with reference to illumination data identified with reference to the direct illumination source and the VPL received from the server computing device, and storing data corresponding to the virtual environment including the direct illumination source, the first object and the second object in a memory in the client computing device; and generating with the second processor in the client computing device a graphical display of the virtual environment including the surface of the second object with the generated illumination data.

2. The method of claim 1 further comprising:
generating with the first processor in the server computing device a plurality of VPLs at a plurality of locations in the virtual environment corresponding to a plurality of intersections of a plurality of rays from the direct illumination source and a plurality of objects in the virtual environment; and
sending data corresponding to only a portion of the plurality of VPLs to the client computing device through the data network, the portion of the VPLs corresponding to a portion of the plurality of objects in the virtual environment that are displayed in a display device in the client computing device.

3. The method of claim 1 further comprising:
transforming the second object in the virtual environment with the second processor in the client computing device;
generating illumination data for the surface in the transformed second object in the virtual environment using the VPL with the second processor in the client computing device without receiving additional data corresponding to the VPL from the server computing device;
generating with the display device another graphical display of the virtual environment including the surface of the second object with the illumination data generated for the transformed second object surface.

4. The method of claim 1 further comprising:
identifying with the first processor in the server computing device a change in the virtual environment that invalidates the VPL that is sent to the client computing device;
generating with the second processor illumination data for the surface of the second object with only the direct illumination source in response to a failure to receive data corresponding to another VPL from the server computing device; and
generating another graphical display of the virtual environment including the second object only illuminated by the direct illumination source with the display device.

5. The method of claim 4 wherein the VPL is invalidated in response to a transformation of the first object.

6. The method of claim 4 wherein the VPL is invalidated in response to a transformation of the direct illumination source.

7. The method of claim 4 wherein the VPL is invalidated in response to a transposition of another object in the virtual environment between the direct illumination source and the first object.

8. The method of claim 1 further comprising:
sending the VPL from the server computing device to another client computing device;
generating with a third processor in the other client computing device illumination data for a surface of a third object in the virtual environment with reference to illumination identified with reference to the direct illumination source and the VPL received from the server computing device, and storing data corresponding to the virtual environment including the direct illumination source, the first object and the second object in another memory in the other client computing device; and
generating another graphical display of the virtual environment including the surface of the third object with the other generated illumination data with another display device operatively connected to the third processor in the other client computing device.

9. A system for displaying three-dimensional graphics comprising:
a server computing device comprising:
a first memory configured to store data corresponding to a virtual environment including a first object, a second object, and a direct illumination source;
a first network interface device configured to send data through a data network; and
a first processor operatively connected to the first memory and the first network interface device, the first processor being configured to:
generate the virtual environment including the first object, the second object, and the direct illumination source;
generate a virtual point light (VPL) in the virtual environment at a location corresponding to an intersection of a ray from the direct illumination source and the first object; and
send data corresponding to the VPL with the first network interface device to a client computing device through the data network; and
the client computing device comprising:
a second memory configured to store data corresponding to the virtual environment including the first object, the second object, and the direct illumination source;
a second network interface device configured to receive data from the data network;
a display device; and
a second processor operatively connected to the second memory, the second network interface device, and the display device, the second processor being configured to:
receive data corresponding to the VPL from the server computing device with the second network interface device;
generate illumination data for a surface of the second object in the virtual environment with reference to illumination identified with reference to the direct illumination source and the VPL received from the server computing device;
store data corresponding to the virtual environment including the direct illumination source, the first object and the second object in the second memory; and
generate with the display device a graphical display of the virtual environment including the surface of the second object using the generated illumination data.

10. The system of claim 9, the second processor being further configured to:
transform the second object in the virtual environment;
generate illumination data for the surface of the transformed second object in the virtual environment using the VPL without receiving additional data corresponding to the VPL from the server computing device; and
generate with the second processor in the client computing device another graphical display of the virtual environment including the surface of the transformed second object using the other generated illumination.

11. The system of claim 10, the first processor being further configured to:

identify a change in the virtual environment that invalidates the VPL.

12. The system of claim 11, the second processor being further configured to:
generate illumination data for the surface of the second object with reference to the direct illumination source only in response to a failure to receive data corresponding to another VPL from the server computing device; and
generate with the display device another graphical display of the virtual environment including the second object only illuminated by the direct illumination source.

13. The system of claim 11 wherein the first processor invalidates the VPL in response to a transformation of the first object.

14. The system of claim 11 wherein the first processor invalidates the VPL in response to a transformation of the direct illumination source.

15. The system of claim 11 wherein the first processor invalidates the VPL in response to a transposition of another object in the virtual environment between the direct illumination source and the first object.

16. The system of claim 9 the first processor being further configured to:
send the VPL with the network interface device to another client computing device.

17. The system of claim 16, the other client computing device further comprising:
a third memory configured to store data corresponding to the virtual environment including the first object, the second object, and the direct illumination source;
a third network interface device configured to receive data from the data network;
another display device; and
a third processor operatively connected to the third memory, the third network interface device, and the other display device, the third processor being configured to:
receive data corresponding to the VPL from the server computing device with the third network interface device;
generate illumination data for a surface of a third object in the virtual environment with reference to the direct illumination source and the VPL received from the server computing device; and
generate with another display device operatively connected to the third processor in the other client computing device another graphical display of the virtual environment including the surface of the third object with the illumination data generated for the surface of the third object.

18. The system of claim 9 wherein the client computing device is a mobile electronic device.

* * * * *